Figure 1:
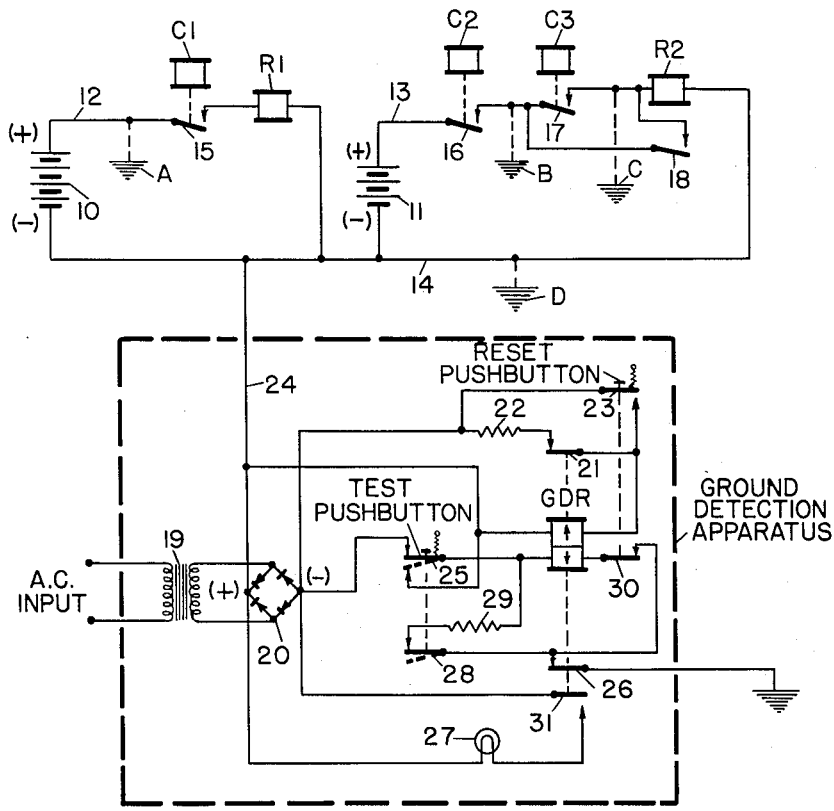

Feb. 14, 1956     C. A. PICKELL     2,735,089

GROUND DETECTING APPARATUS

Filed Dec. 17, 1953

*INVENTOR.*
C. A. PICKELL
BY
HIS ATTORNEY

United States Patent Office 2,735,089
Patented Feb. 14, 1956

2,735,089

GROUND DETECTING APPARATUS

Clark A. Pickell, Rochester, N. Y., assignor to General Railway Signal Company, Rochester, N. Y.

Application December 17, 1953, Serial No. 398,811

7 Claims. (Cl. 340—255)

This invention relates to circuit means capable of detecting the presence of undesired grounds in an electrical circuit.

In direct-current electrical circuits wherein none of the wires or devices is normally grounded, the presence of a single ground because of a fault in one of the wires is not effective to cause an erroneous or unsafe circuit condition to be established. The presence of two different grounds can, however, easily result in an unsafe condition because the two grounds can, in effect, short-circuit a circuit-selecting contactor and thereby produce false operation of an electromagnetic relay. Such a condition is particularly dangerous in a railway signalling system where the improper operation of a relay can conceivably cause an unsafe signal aspect to be displayed. It is, therefore, desirable that means be provided to detect the presence of any single ground that may occur in an electrical circuit so that the condition can immediately be corrected and thus minimize the possibility that two or more grounds may simultaneously be present and cause an unsafe condition to be set up.

In some prior types of ground detector systems, the apparatus is effective to provide a continual check for the presence of grounds but requires fairly complex and costly apparatus. It is contemplated that the ground detector system of this invention will require a minimum of apparatus and yet also provide a continual check for the presence of undesired grounds.

In these prior types of ground detector systems, the current required to operate the ground detecting means is usually kept at a very low value so that this current will not, under certain circumstances, produce erroneous operation of relays included in the circuit. In the ground detector system of this invention, however, there is no need to maintain this operating current at such a very low value because its direction of flow through the relays is in opposition to the usual polarity of current and will, under the same circumstances, cause the various relays to be dropped away.

Also, in some of these prior systems, it is necessary to connect the ground detecting means alternately and successively to the common and the positive control wires respectively so that grounds on either side can be detected. As a result, the shunt line capacitance is alternately charged and discharged, and the resulting transient currents frequently have undesired effects on the circuit organization being checked. In the ground detector system of this invention, however, these undesired effects cannot occur because there is no alternate charging and discharging of the line capacitance.

Another disadvantage of the prior ground detector systems is that the existence of a ground of some finite resistance on one control wire reduces the sensitivity of the ground detection means with respect to the detection of grounds on the other control wire. As a result, grounds of gradually decreasing resistance can appear on both wires at the same time and not be detected. With the ground detection system of this invention, however, the effects of grounds on the different wires are cumulative and therefore readily detected.

Described briefly, the ground detector system of this invention comprises essentially a source of direct-current energy, a ground detecting relay, and circuit means for connecting to the circuit organization being checked. A single wire connection only is required between the ground detecting apparatus and a common wire in the checked circuit organization, but this is effective to check for the presence of grounds anywhere in the circuit organization.

An object of this invention is to provide ground detecting apparatus for electrical circuits that requires a minimum of apparatus.

Another object of this invention is to provide ground detecting apparatus for electrical circuits wherein a higher level of current to operate the detection apparatus may be tolerated.

Another object of this invention is to provide a ground detection system which does not cause alternate charging and discharging of the shunt line capacitance.

Still another object of this invention is to provide a ground detection system of the general kind described employing a neutral type of ground detecting relay.

Another object of this invention is to provide a ground detection system of the general kind described employing a magnetic stick type of ground detecting relay.

An additional object of this invention is to provide a ground detector system wherein the effects of resistance grounds on the individual control wires are cumulative and thus more readily detected.

Other objects, purposes, and characteristic features of this invention will in part be obvious from the accompanying drawings and in part pointed out as the description of the invention progresses.

Figure 2:
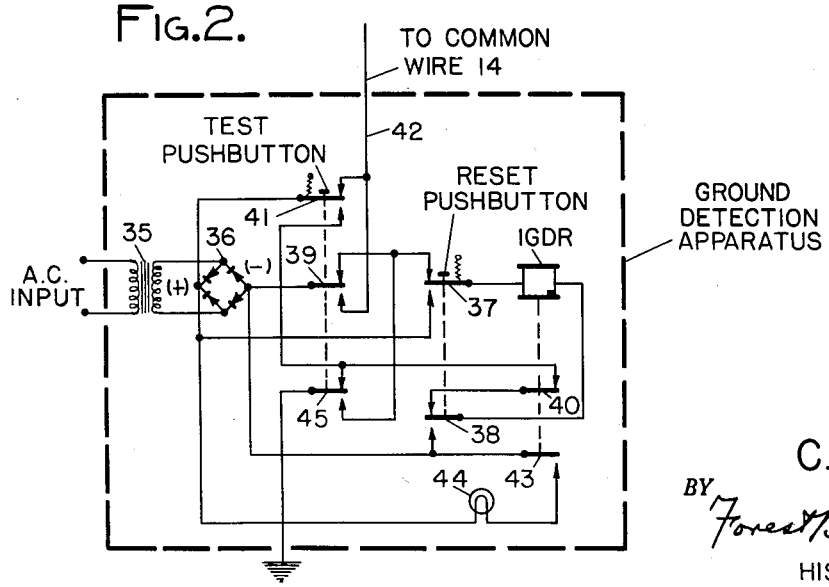

In the description of the invention that follows, reference will be made to the accompanying drawings in which:

Fig. 1 illustrates one embodiment of this invention having a neutral type of ground detection relay and disclosing one means by which the location of a ground can be ascertained after its presence has been detected; and Fig. 2 illustrates a second embodiment of this invention having a magnetic stick type of ground detection relay and disclosing an alternative means by which the location of a ground can be ascertained after its presence has been detected.

*Embodiment of Fig. 1*

Fig. 1 illustrates a typical electrical circuit organization which is to be checked for the presence of undesired grounds. The circuit organization comprises batteries 10 and 11 having their positive terminals connected respectively to wires 12 and 13 and their negative terminals both connected to a common wire 14. When relay C1 is picked up and closes its front contact 15, a circuit is closed to energize relay R1; and when relays C2 and C3 are both picked up to close their front contacts 16 and 17, a circuit is closed to energize relay R2. A stick circuit including front contact 18 maintains relay R2 energized when once picked up even if front contact 17 of relay C3 is opened.

The reference characters A, B, C and D designate possible grounds that may occur in the circuit organization as the result of faults in the various wires or devices included in the circuit. A ground at A, for example, in effect grounds the positive terminal of the battery 10. A ground may occur between two series-connected contacts controlling a relay as at B or between a relay-controlling contact and the relay it controls as at C. A ground may also appear on the negative or common wire of the various circuits as at D.

None of these false grounds can by itself cause the actuation of either relay R1 or R2. Obviously, however, the occurrence of grounds at both B and C will, in effect, cause contact 17 to be short-circuited so that relay R2 will be picked up even though this contact is open. Such false operation of the relay R2 may readily result in the establishment of a dangerous condition. A single ground on each of two or more circuits may also cause an improper relay operation. Grounds occurring at the same time at A and B, for example, cause energy to be fed from the (+) terminal of battery 10, through ground A to ground B, and through front contact 17 of relay C3 and the winding of relay R2 to common wire 14 and the (—) terminal of battery 10. As a result, relay R2 can be energized even though its controlling contact 16 is open.

The ground detection apparatus shown in Fig. 1 includes a source of direct-current energy. This source of energy may be obtained by rectifying an alternating-current input to the apparatus. The application of an alternating voltage to the terminals designated AC Input causes the primary winding of the transformer 19 to be energized. The induced voltage appearing in the secondary winding of the transformer then appears across opposite terminals of a full-wave bridge rectifier 20. The rectified output appears across the terminals designated (+) and (—). The required direct current can equally well be supplied by a battery or other suitable source.

The neutral type ground detector relay GDR has its upper winding normally conected across the output of the rectifier 20. This circuit may be traced from the (+) output terminal of the rectifier, through the upper winding of relay GDR, front contact 21 of relay GDR, and resistor 22, to the (—) terminal of rectifier 20. When power is first applied, the relay GDR is, of course, in its dropped away condition so that its front contact 21 is open. The ground detection apparatus is then placed in its normal operating condition by depressing the Reset push-button which causes its back contact 23 to be momentarily closed. As a result, the upper winding of relay GDR can then be energized through this back contact 23 of the Reset push-button. When the push button is restored to its normal condition, replay GDR is maintained energized through the previously described stick circuit including its front contact 21 and resistor 22. Resistor 22 limits the amplitude of current through the upper winding of relay GRD to a value just sufficient to hold this relay in its picked-up condition.

The positive output terminal of rectifier 20 is connected directly over wire 24 to the common or negative wire 14 of the circuits being checked. At the same time, the negative output terminal (—) of rectifier 20 is connected through the normally closed contact 25 of the Test push-button, through the lower winding of relay GDR closed contact 30 of the Reset push-button and front contact 26 of relay GDR, to ground. Resistor 29 normally shunts the lower winding of relay GDR through closed contact 28 of the Test push-button. This decreases the sensitivity of the lower winding until the Test push-button is depressed to open-circuit resistor 29 for reasons to be given later.

If a ground appears on wire 14 as indicated at D, a circuit is completed to energize the lower winding of relay GDR. This circuit extends from the (+) output terminal of rectifier 20 and includes wire 24, wire 14, ground D, the ground included in the ground detection apparatus, front contact 26 of relay GDR, closed contact 30 of the Reset push-button, the lower winding of relay GDR, and normally closed contact 25 of the Test push-button, to the (—) terminal of rectifier 20. The magnitude of this current through the lower winding of relay GDR is determined by the resistance of the ground D and resistance of lower winding of relay GDR as related to the level of output voltage supplied by the rectifier 20. Since the polarity of this current through the lower winding of relay GDR is opposite to that normally present in the upper winding, there is a tendency to decrease the magnetic flux maintaining the relay picked up so that relay GDR will drop away if there is a sufficient flow of current through its lower winding. When relay GDR does drop away, its back contact 31 closes so that a circuit is completed to illuminate an indicator lamp 27 and thus give a visual indication of the fact that a ground has occurred in the circuit being checked. Also, as soon as relay GDR drops away, its front contact 26 opens thereby stopping the flow of current through the ground D. At the same time, front contact 21 of relay GDR opens to open the stick circuit normally holding its upper winding energized. With the Reset push-button in its normally open condition, relay GDR remains in its dropped-away condition until it has been properly reset.

When a ground occurs on one of the positive control wires at as A, a circuit is again completed to energize the lower winding of relay GDR with a polarity of current that causes this relay to drop away. With a ground at A, the circuit is completed from the (+) terminal of rectifier 20, over wire 24, wire 14, battery 10, wire 12, ground A, the ground connection of the ground detection apparatus, front contact 26 of relay GDR, closed contact 30 of the Reset push-button, the lower winding of relay GDR, and normally closed contact 25 of the Test push-button, to the (—) terminal of rectifier 20. In this circuit, the output voltages of the rectifier 20 and battery 10 are in series. Because of this higher voltage being available to detect grounds on the positive side of the circuits a ground of higher resistance on one of the positive wires will still result in sufficient current through the lower winding of relay GDR to cause this relay to drop away and thus indicate its presence. This difference in ground detecting sensitivity between the common and the positive wires is reduced when the voltage provided for the ground detection apparatus is chosen to be higher than that supplied by the battery for each checked circuit such as by batteries 10 and 11. This condition results from the fact that, as the voltage of rectifier 20 increases with respect to the voltage of either battery 10 or 11, the voltage effective in checking for a positive-wire ground more nearly equals the voltage effective in checking for a common-wire ground.

A ground occurring between series-connected contacts in one of the positive control wires as at B is detected in the same manner as the ground at A provided that the relay contacts between this ground and the (+) terminal of the battery are closed. Obviously when front contact 16 of relay C2 is closed, ground B will be detected in the same manner as ground A just described.

A ground such as at C will readily be detected in the same way if all the contacts between it and the (+) battery terminal are closed such as front contacts 16 and 17 of relays C2 and C3 respectively.

If the resistance of the ground at C plus the resistance of the relay R2 is sufficiently low, the ground at C may be detected even if one or more of the contacts 16 or 17 is open. Under these circumstances, a circuit is completed from the (+) terminal of the rectifier 20, over wire 24, wire 14, through the winding of relay R2, ground C, the ground provided for the ground detection apparatus, front contact 26 of relay GDR, normally closed contact 30 of the Reset push-button, the lower winding of relay GDR, normally closed contact 25 of the Test push-button, to the (—) terminal of rectifier 20. Provided that the resistance at ground C and resistance of relay R2 are both sufficiently low, enough current will pass through the lower winding of relay GDR to cause this relay to drop away and thereby indicate the presence of a ground at C.

Under these latter circumstances, the detection of the ground at C is dependent upon passing current through the winding of relay R2. This current passes through the winding of relay R2 from right to left and is thus in a direction opposite to that normally provided by battery 10 for energizing this relay. Consequently, even if the current required for actuation of the ground detector should be sufficient to cause relay R2 to pick up, any stick circuit which might be established to hold this relay energized such as that provided through its front contact 18, will energize it with a current of opposite polarity so that relay R2 will quickly be dropped away. Furthermore, the energization of relay R2 by current provided from the ground detection apparatus persists only for the length of time required for relay GDR to drop away since the opening of front contact 26 of this relay opens the ground detection circuit, and this circuit cannot again be established until the ground detection apparatus has been manually reset by operation of the Reset push-button.

Regardless of where the ground occurs, its detection causes relay GDR to drop away. Since it is desirable to provide means for determining whether the ground exists on a positive control wire or on the common control wire, a Test push-button is provided. When the presence of a ground has been made evident by the illumination of lamp 27, an operator may then test for the location of the ground by depressing both the Test push-button and the Reset push-button. Actuation of the Reset push-button causes relay GDR to pick up. While the Reset push-button is depressed, the lower winding of relay GDR is open-circuited because of the open front contact 30 of the Reset push-button. The manner in which relay GDR operates when the Reset push-button is restored to normal provides the information as to the location of the ground.

With relay GDR restored to its normal picked-up condition, the right-hand terminal of the lower winding of this relay is connected through its front contact 26 to ground. Since the Test push-button is still depressed, the left-hand terminal of this winding is now connected through closed back contact 25 of the Test push-button and over wire 24 to the common wire 14. If the ground that has been detected is on this common wire 14, both terminals of the lower winding of relay GDR are then connected to ground so that this winding is short-circuited. Consequently, relay GDR will remain in its picked-up condition while the Test push-button is maintained depressed even if the Reset push-button is restored so as to hold relay GDR energized only through its own front contact 21.

If the ground that has been detected is on one of the positive control wires as at A, a circuit is completed to energize the lower winding of relay GDR. This circuit extends from the (+) terminal of battery 10, and includes the ground at A, the ground of the ground detection apparatus, front contact 26 of relay GDR, closed contact 30 of the Reset push-button, the lower winding of relay GDR, back contact 25 of the Test push-button, wire 24, and wire 14, to the (−) terminal of battery 10. As a result of this circuit, the current provided by battery 10 in passing through the ground at A and the lower winding of relay GDR energizes this lower winding with a polarity opposing that applied to its upper winding through the Reset push-button contact 23, thereby causing this relay to drop away and thereby illuminate lamp 27.

As previously explained, the circuit which was initially effective to cause relay GDR to drop away and thereby detect the presence of a ground on a positive control wire included the output voltage of the rectifier 20 in series with the voltage of battery 10. However, the circuit effective to energize the lower winding of relay GDR when there is a ground on a positive control wire and when the Test push-button has been actuated includes only the battery 10 and not the rectifier 20. Therefore, a lower voltage is effective in this circuit when the Test push-button is actuated than when the ground was originally detected. To compensate for this lower voltage in this circuit, the sensitivity of relay GDR is increased when the Test push-button is actuated by open-circuiting resistor 29 which normally shunts the lower winding of relay GDR through contact 28 of the Test push-button. Disconnecting resistor 29 when the Test push-button is actuated causes all of the current to pass through the lower winding of relay GDR so that this relay can be driven down with a lower value of current passing through the detected ground at A.

The testing procedure may then be summarized by stating that the Test and Reset push-buttons are both actuated. The Reset push-button is then restored to its normal condition. If relay GDR remains in its picked-up condition, the ground is on the negative or common wire. If the relay GDR is immediately dropped away when the Reset push-button is released, the ground is on a positive control wire.

*Embodiment of Fig. 2*

The embodiment of the invention shown in Fig. 2 also includes a source of direct-current energy. The required direct-current can be supplied by a battery or other suitable source, but is shown in Fig. 2 as being provided by a transformer 35 energized by a source of alternating current and with a full-wave rectifier 36 connected across the secondary winding of transformer 35. In this embodiment of the invention the voltage provided by rectifier 36 is preferably chosen so as to equal substantially the voltage appearing in the circuit organization being checked for the presence of grounds.

The ground detection relay 1GDR shown in Fig. 2 is of the kind known as a magnetic stick relay. The armature of this relay is operated to its one position by one particular polarity of current applied to its winding and to its opposite position by the other polarity of current. Because of its magnetic stick characteristics, it remains in its last actuated condition until operated to its opposite condition by the opposite polarity of current applied to its winding.

Relay 1GDR is shown in Fig. 2 as being normally in the condition wherein its front contacts are closed and its back contacts open. Relay 1GDR may be operated to this normal condition at any time by depressing the Reset push-button. This actuation causes the left-hand terminal of relay 1GDR to be connected through back contact 37 of the Reset push-button to the (+) terminal of the rectifier 36. At the same time, the right-hand terminal of this relay is connected through back contact 38 of the Reset push-button to the (−) terminal of rectifier 36. Relay 1GDR is thereby energized with a current passing from left to right through its winding in Fig. 2, and this polarity of current results in the closure of the front contacts of this relay.

Normally the left-hand terminal of relay 1GDR is connected through closed contact 37 of the Reset push-button and through closed front contact 39 of the Test push-button to the (−) terminal of the rectifier 36. At the same time, the right-hand terminal of this relay is connected through closed front contact 38 of the Reset push-button, front contact 40 of relay 1GDR, front contact 45 of the Test push-button, to the ground provided for the ground detection apparatus.

The ground detection apparatus of Fig. 2 is provided with a connection to the common wire 14 of the circuit organization desired to be checked for the presence of undesired grounds. A connection to ground is also provided for this apparatus as illustrated in Fig. 2. Consequently, the occurrence of a ground on either the negative or common ground wire 14 or on any of the positive wires as at A, B, or C (see Fig. 1) results in the energization of the winding of relay 1GDR as will be described with a current passing from right to left through the winding of this relay. As a result, relay 1GDR is actuated to its opposite condition causing its back contact 43 to close and thereby illuminate the indication lamp 44.

When a ground occurs on the common wire 14, a circuit is completed including the winding of relay 1GDR and the full-wave rectifier 36 as a source of power. This circuit extends from the (+) output terminal of rectifier 36, and includes front contact 41 of the Test push-button, wire 42, common wire 14, a ground on the common wire as at D, the ground of the ground detection apparatus, front contact 45 of the Test push-button, front contact 40 of relay 1GDR, front contact 38 of the Reset push-button, the winding of relay 1GDR from right to left, front contact 37 of the Reset push-button, and front contact 39 of the Test push-button, to the (—) terminal of the rectifier 36. Thus, the existence of a ground on the common wire 14 of sufficiently low resistance causes enough current to pass through the winding of relay 1GDR to cause this magnetic stick relay to operate to its opposite condition. As soon as this relay is operated, its front contact 40 opens so as to interrupt this circuit through the ground on the common wire.

When a ground occurs on a positive control wire as at A, B, or C of Fig. 1, a circuit is again completed to energize relay 1GDR and operate this relay to its opposite condition. This circuit extends from the (+) terminal of rectifier 36 and includes front contact 41 of the Test push-button, wire 42, wire 14 of the circuit being checked (see Fig. 1), battery 10, wire 12, the ground at A, the ground of the ground detection apparatus, front contact 45 of the Test push-button, front contact 40 of relay 1GDR, front contact 38 of the Reset push-button, the winding of relay 1GDR, from right to left, front contact 37 of the Reset push-button, and front contact 39 of the Test push-button, to the (—) terminal of rectifier 36. Again, if the ground at A is of sufficiently low resistance, enough current will pass through the winding of relay 1GDR from right to left to cause this relay to operate to its opposite condition so as to close back contact 43 and illuminate lamp 44.

The operating features and characteristics of this embodiment of the invention shown in Fig. 2 are similar to that described for the embodiment illustrated in Fig. 1. Thus, a higher voltage is available for checking grounds on the positive control wires than on the common wire 14 because of the fact that the output voltage of the battery in the checked circuit such as battery 10 adds to the voltage of the ground detection apparatus provided by rectifier 36. For this reason, it is possible to detect grounds of somewhat higher resistance on the positive control wires than on the negative or common control wires.

Means are provided in connection with the embodiment of the invention shown in Fig. 2 to determine whether a ground that has occurred is on one of the positive control wires or on the common wire. To determine this, the Reset and Test push-buttons are both depressed. Actuation of the Rest push-button results in the restoration of relay 1GDR to its normal condition in a manner already described. When the Reset push-button is restored to its normal condition but with the Test push-button still actuated, a circuit is established which causes relay 1GDR to be operated to its opposite condition thereby causing back contact 43 to close and lamp 44 to again be illuminated.

If the ground that has been detected is on a positive control wire as at A, a circuit is completed from the (+) terminal of rectifier 36, through back contact 41 of the Test push-button, front contact 40 of relay 1GDR, front contact 38 of the Reset push-button, the winding of relay 1GDR, front contact 37 of the Reset push-button, back contact 45 of the Test push-button, through the ground provided for the ground detection apparatus, through the ground on the positive control wire, through the battery 10 from (+) to (—), over wire 14, to wire 42, and through back contact 39 of the Test push-button, to the (—) terminal of rectifier 36. In this circuit, both the output voltages of the rectifier 36 and battery 10 appear in series but with different polarities. Since the output voltage of rectifier 36 is chosen in this embodiment of the invention to equal susbtantially the voltage of battery 10, there is no net voltage acting in the circuit so that the winding of relay 1GDR is not energized.

If, however, the ground that has been detected is on the common control wire as at D, a circuit is completed to energize the winding of relay 1GDR and operate it to its opposite condition. This circuit is identical to the one just described with the exception that since the ground is on the common wire, it does not include battery 10. The only source of energy in the circuit is then the output voltage of rectifier 36, and this is effective to cause current to pass through the ground on the common wire and through the winding of relay 1GDR thereby causing this relay to be actuated to its opposite condition so that the indication lamp 27 will be illuminated.

The testing procedure for determining whether a detected ground is on the common wire or on one of the positive wires may be summarized by stating that operation of the Reset and Test push-buttons together with first result in the restoration of relay 1GDR to its normal condition. Releasing the Reset push-button will then cause relay 1GDR to be operated to its opposite condition with its back contact closed only if the ground is on the common wire, but there will be no effect on this relay if the ground is on one of the positive control wires.

As previously stated, the effects of grounds of finite resistance on both positive and common control wires concurrently are cumulative with respect to the ground detection system of this invention. This characteristic contrasts with that of some prior types of ground detector systems wherein the presence of a ground on one control wire reduces the sensitivity of the ground detection apparatus for detecting grounds on the other control wire. With respect to either of the embodiments of Fig. 1 or Fig. 2, the occurrence of grounds on either the common wire 14 or any of the positive control wires results in energization of the ground detection relay. Where several grounds are present, any one ground may, by itself, be of sufficiently high resistance so that insufficient current can pass through this ground and operate the ground detection relay. The additive effects resulting from the flow of currents through these several grounds, all of which pass through the winding of the ground detection relay, may readily cause this relay to be actuated, thereby resulting in a system of increased sensitivity.

In the ground detection system of this invention, the circuit organization provided is static in that there is no need for alternately connecting the ground detection means to first the positive and then the common wires so as to detect for grounds first on the common wire and then on the positive control wire, back and forth repeatedly. Thus, steady-state conditions exist continually with respect to the ground detector system so that there is no alternate charging and discharging of the line capacitance normally present in such a system. In some prior types of ground detection systems, difficulties frequently arise from the continuous charging and discharging alternately of the line capacitance, but such difficulties do not arise in this system because the ground detection apparatus is continually connected over wire 24 to the common or negative wire of the circuit organization being checked for grounds.

Having described a ground detector system as one specific embodiment of my invention, I desire it to be understood that this form was selected merely to illustrate one specific embodiment of this invention and that various modifications, adaptations, and alterations may be made to the specific form shown to meet the requirements of practice without in any way departing from the spirit or scope of the invention.

What I claim is:

1. In a ground detector system for an electrical circuit organization having a plurality of circuits each being energized by a different source of direct current and having a single common control wire connected to terminals of like polarity on each of said sources of direct current, ground detection apparatus comprising a series-connected combination including the winding of a ground detection relay and another source of direct current, said series-connected combination being connected at one end to said common wire and at the other end to ground, said another source of direct current being connected to aid the polarity of each of said different sources of direct current included in said plurality of circuits, and indicating means governed by the actuation of said ground detection relay, whereby the occurrence of a ground in any of said plurality of circuits results in actuation of said ground detection relay to thereby cause an indication of said ground to be given.

2. In a ground detector system for an electrical circuit organization, a first source of direct current for energizing a controlled device over a pair of control wires, said source of direct current having its positive terminal connected to a designated positive one of said control wires and its negative terminal connected to a designated one of said control wires, ground detection apparatus comprising the series combination of a drive-down winding of a ground detection relay and a second source of direct current, said series combination having its one terminal grounded and its other terminal connected to said negative control wire, stick circuit means for normally maintaining said ground detection relay picked up, the current flowing in said drive-down winding upon the occurrence of a ground in either said positive or said negative control wires being effective to magnetize said drive-down winding in opposition to that made effective by said stick circuit means to thereby cause said ground detection relay to drop away, and means governed by the dropping away of said relay to open-circuit said drive-down winding, whereby said dropping away of said ground detection relay provides an indication that a ground has occurred in said circuit organization.

3. In a ground detector system for an electrical circuit organization wherein a device is selectively energized over a pair of wires by a first source of direct current, ground detection apparatus comprising, a ground detection relay having its one terminal connected to ground and its other terminal connected through a second source of direct current to one of said pair of wires with the polarity of said first and second sources of direct current being respectively aiding, testing means for selectively connecting said other terminal of said ground detection relay directly to said one of said pair of wires, and means governed by said testing means for increasing the sensitivity of said ground detection relay while said other terminal is directly connected to said one of said pair of wires, whereby only a ground on the other of said pair of wires causes actuation of said relay to thereby indicate whether said ground is on said one or the other of said pair of wires.

4. In a ground detector system for an electrical circuit organization, a first source of direct current for energizing a controlled device over a pair of control wires, said source of direct current having its positive terminal connected to a designated positive one of said control wires and its negative terminal connected to a designated negative one of said control wires, ground detection apparatus comprising a second source of direct current and a neutral type of ground detecting relay having two windings, circuit means associated with one of said windings to pick up said relay and to hold said one winding energized through a front contact of said relay, means for establishing a series circuit from ground to said negative control wire through the other winding of said relay and through a front contact of said relay and also including said second source of direct current with a polarity to aid the polarity of said first source of direct current, and indication means governed by said ground detection relay, whereby the presence of a ground on one of said control wires causes said other winding of said ground detection relay to be energized with a polarity to oppose the effect of the energization of said one winding of said relay to thereby cause said relay to drop away and provide an indication of said ground.

5. In a ground detector system for an electrical circuit organization, a first source of direct current for energizing a controlled device over a pair of control wires, said source of direct current having its positive terminal connected to a designated positive one of said control wires and its negative terminal connected to a designated negative one of said control wires, ground detection apparatus comprising a second source of direct current and a magnetic stick type of ground detector relay, resetting means for said relay to restore said relay to its normal condition by energizing its winding with a particular polarity of direct current, means for establishing a series circuit from ground to said negative control wire through the winding of said relay and through said second source of direct current with a polarity aiding the polarity of said first source of direct current, and indication means governed by said ground detection relay, whereby the occurrence of a ground in said circuit organization causes the winding of said magnetic stick ground detection relay to be energized with a polarity opposite that for resetting said relay to thereby cause said relay to drop away and provide an indication of said ground.

6. In a ground detector system for an electrical circuit organization, a first source of direct current for energizing a controlled device over a pair of control wires, said source of direct current having its positive terminal connected to a designated positive one of said control wires and its negative terminal connected to a designated negative one of said control wires, a series circuit including said second source of direct current and a ground detector relay connected at one end to ground and at the other end to said negative control wire with the polarity of said second source of direct current aiding the polarity of said first source of direct current, polarity testing means to determine the location of said ground comprising switching means for selectively removing said second source of direct current from said series circuit, said ground detector relay thereby being energized through said ground appearing on said control wires only when said ground appears on said positive control wire to thereby determine whether said ground occurs on said positive or said negative control wire.

7. In a ground detector system for an electrical circuit organization, a first source of direct current for energizing a controlled device over a pair of control wires, said source of direct current having its positive terminal connected to a designated positive one of said control wires and its negative terminal connected to a designated negative one of said control wires, a series circuit including a source of direct current and a ground detector relay connected at one end to ground and at the other end to the negative one of said control wires with the polarity of said second source of direct current aiding that of said first source of direct current, said second source of direct current having a voltage substantially equalling the voltage of said first source of direct current, polarity testing means to determine the location of said ground comprising switching means for selectively reversing the polarity of said second source of direct current in said series circuit with respect to said first source of direct current, whereby said relay is energized to provide an indication of a ground only when said ground occurs on said negative control wire.

References Cited in the file of this patent

UNITED STATES PATENTS

| Number | Name | Date |
|---|---|---|
| 568,494 | Rowand | Sept. 29, 1896 |
| 1,055,018 | Burnham | Mar. 4, 1913 |
| 1,229,939 | Goldstein | June 12, 1917 |
| 2,022,758 | Corderman | Dec. 3, 1935 |
| 2,157,237 | Horni | May 9, 1939 |
| 2,600,717 | Hood | Nov. 24, 1953 |
| 2,684,475 | Lode | July 20, 1954 |